R. H. THORN.
Chuck.
No. 58,152.
Patented Sept. 18, 1866.
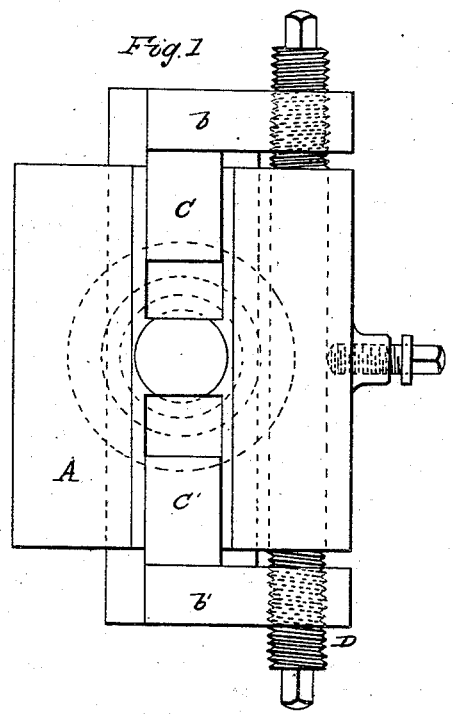
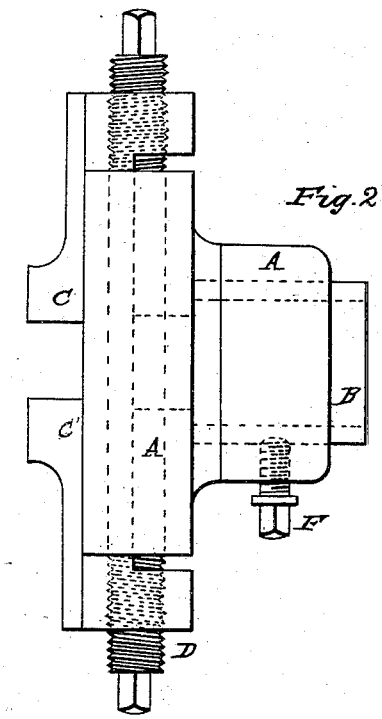
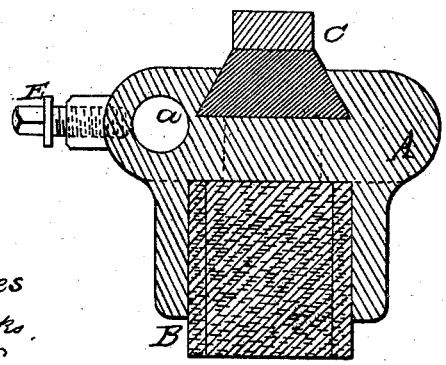
Witnesses
Wm. R. Brooks
John E. Sweet
Inventor
Royal H. Thorn

UNITED STATES PATENT OFFICE.

ROYAL H. THORN, OF SYRACUSE, NEW YORK.

IMPROVEMENT IN CHUCKS.

Specification forming part of Letters Patent No. 58,152, dated September 18, 1866.

*To all whom it may concern:*

Be it known that I, ROYAL H. THORN, of the city of Syracuse, county of Onondaga, State of New York, have invented certain new and useful Improvements in Chucks for Lathes; and I do hereby declare the following to be a sufficiently clear and exact description of the same that any one skilled in such matters may, in connection with the accompanying drawings, which form a part of my specification, readily construct and use my invention.

I may premise, however, the remark that my chuck is more especially adapted to turning bolts or such like articles, though, in practice, it is found applicable to various other purposes, as will be hereinafter explained.

Now, the chief object of my invention is to supply the latheman or machinist with a chuck which, when applied to the ordinary iron lathes in use, shall be—first, adjustable to bolt-heads of different sizes; second, a chuck that will adjust itself to the bolt-head, whether the same is either concentric or eccentric with the body of the bolt to be turned; third, a chuck adjustable to accommodate itself to a long or short lathe-center; fourth, a chuck that can be rendered both rigid and movable for doing peculiar kinds of eccentric work.

Figure 1 is a face view of the chuck; Fig. 2, a side view of the same; Fig. 3, a cross-section.

Like letters refer to corresponding parts in all figures.

A is the body of the chuck, made of cast-iron or any suitable material; B, a loose sleeve, threaded on the inside, to fit the mandrel of the lathe on which the chuck is to be used, and turned outside to fit in the hole in the boss of the chuck. By using different sleeves one chuck can be made to serve on many different lathes.

C C' are sliding jaws, made of iron or steel, dovetailed into the body of the chuck, and fitted so as to move freely therein; D, a screw having a right-hand thread at one end and a left-hand thread at the other, and squared down to receive a wrench at either end. This screw passes loosely through the hole in the body of the chuck *a*, Fig. 3, and is threaded into the projections *b b'* of the movable jaws. E and F are set-screws.

The sleeve B being screwed on the mandrel of the lathe, which is always threaded for that purpose, and the set-screw F loosened, it will be seen that the body of the chuck can be adjusted in and out to suit the length of the center or work to be done; and when the work or article to be turned is on the center, by applying a wrench to the screw D the jaws C C' can be brought together and clamp the work, whether square, hexagon, round, concentric, or eccentric, without in any way throwing any side strain on the center. Work to be operated upon may be clamped between the jaws and held without using centers, as in an ordinary chuck, and secured, either concentric, eccentric, or both, when desired, by the set-screw E clamping the screw D.

Having thus briefly explained the nature of my invention, what I claim, and desire to secure by Letters Patent, is—

Clamping the jaws C C' by the screw D and allowing the same to play freely through the body of the chuck, for the purposes set forth.

ROYAL H. THORN.

Witnesses:
JOHN E. SWEET,
WM. W. COCK.